Figures 1, 2:
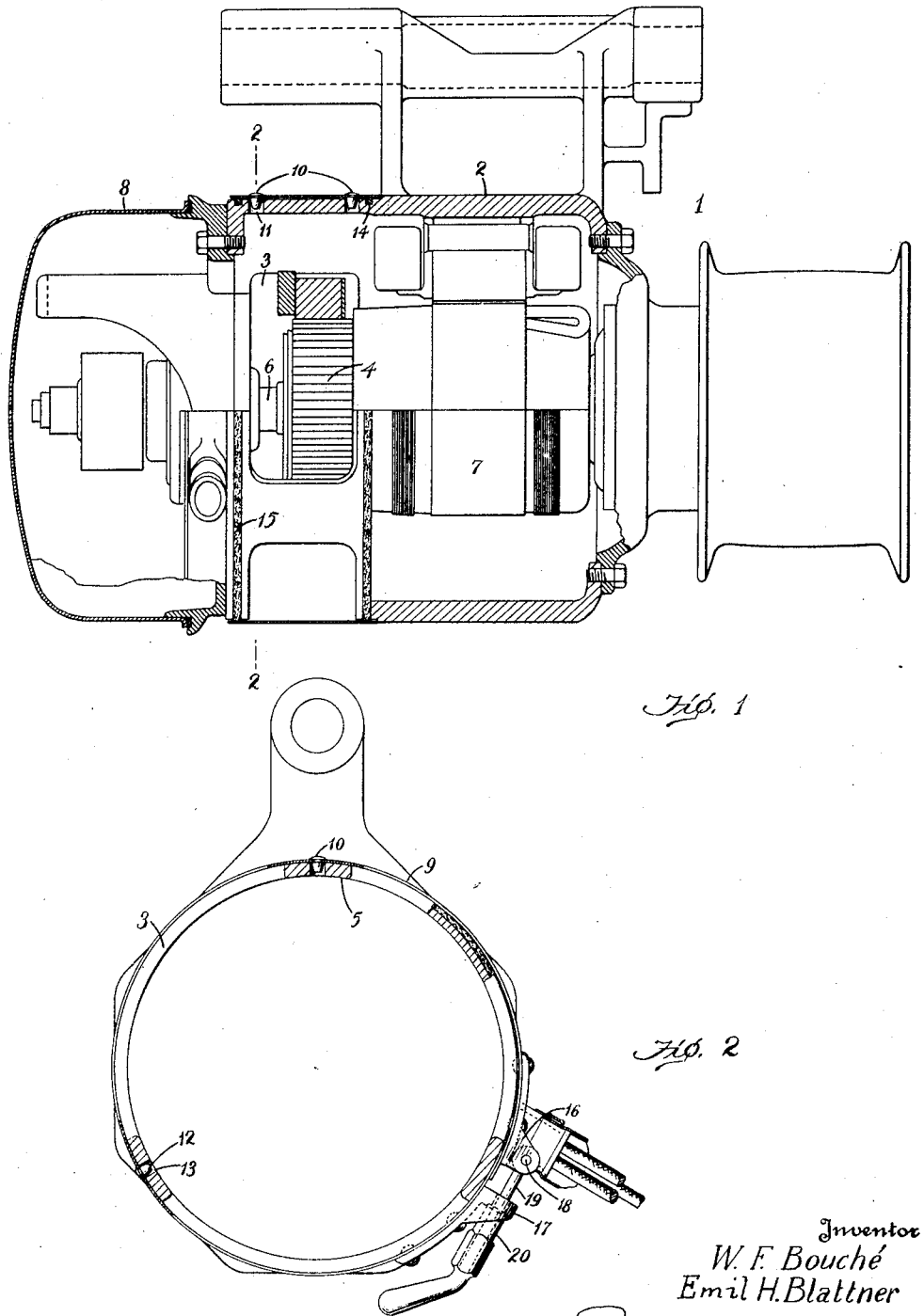

May 20, 1930.  W. F. BOUCHÉ ET AL  1,759,035
GENERATOR COVER BAND
Filed Sept. 9, 1927

Inventor
W. F. Bouché
Emil H. Blattner

Patented May 20, 1930

1,759,035

UNITED STATES PATENT OFFICE

WILLIAM F. BOUCHÉ AND EMIL H. BLATTNER, OF ROCHESTER, NEW YORK, ASSIGNORS, BY MESNE ASSIGNMENTS, TO SIMPLEX EQUIPMENT COMPANY, INC., OF NEW YORK, N. Y., A CORPORATION OF DELAWARE

GENERATOR-COVER BAND

Application filed September 9, 1927. Serial No. 218,498.

The invention relates to attachments to or accessories for use in connection with generators such as form part of car lighting equipment and has special reference to a band for covering the openings in the frame opposite the commutator so as to exclude dirt, dust and other foreign matter.

It is well known that it is a common practice to provide a cover band lined on its inner face with canvas which serves as a pad or gasket to close the openings which are opposite the commutator. The ordinary band is applied in such position that the joint falls upon one of the (usually three) bar sections which extend across the commutator openings, and the band is usually of such length that an appreciable opening is left between the ends which are, however, pulled down snugly against the bar section. The whole seat on which this type of band rests is turned to a smooth surface. It is customary to provide large top rivets for the purpose of locating the band circumferentially so that the joint shall fall properly upon one of the lower cross bars and it is also necessary to provide a number of other rivets located at intermediate points for the purpose of securing the lining to the band, these intermediate rivets fitting within openings or depressions in the seat for the purpose of preventing the band from skewing off laterally of itself or endwise with respect to the generator. In actual manufacture it has been found that the provision of the canvas lining and the large number of rivets required to secure it to the metal band constitutes a very considerable item of expense, partly on account of the cost of materials but principally as the result of the labor necessary in assembling.

It is with the above facts in view that we have made the present invention which has for its principal object the provision of an all metal band and means on the generator cooperating therewith for making an effective seal without it being necessary to provide such a lining or to grind or otherwise finish the seat.

Another object of the invention is to provide a band of this character having clamping means whereby the ends thereof may be overlapped upon one of the cross bars, resilient packing means being carried by the generator where it is engaged by the band, the packing means being of such nature as to close the very slight triangular opening resulting from the overlapping of the ends of the band.

Another object of the invention is to provide a band of this character in which the number of rivets necessary to effect proper location and prevent slipping off is reduced to the very minimum, the cost of preparing the generator for the mounting of the band being thereby greatly decreased.

An additional object of the invention is to provide a band of this character which will be not only simple and inexpensive to manufacture, but easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a view of a generator, partly in elevation and partly in section, showing it as equipped with a preferred embodiment of the invention, and Figure 2 is a cross sectional view taken on substantially the line 2—2 of Figure 1 with the major portion of the band shown in edge view and with parts broken away and in section to show the locating and retaining rivets.

Referring more particularly to the drawing the numeral 1 designates, generally, a generator which may be and preferably is of the type used in connection with car lighting equipment. This generator comprises the usual magnet frame 2 having openings 3 therein opposite the commutator 4 to permit access to the brushes and brush holders, or other adjacent parts in case of any necessity for making repairs, adjustments or replacements. These openings 3 are separated by cross bar portions 5 which are integral with the frame. The commutator is of course carried by the usual shaft 6 and is associated with the armature 7. The numeral 8 designates the dome or shell covering the end of the generator for the purpose of excluding foreign matter from the interior. The above described parts are all old and well known and no novelty is claimed for them. Numerous other structural features of the generator and a bracket device for mounting the same are shown in the drawing but a description thereof is believed to be unnecessary to a proper understanding of the novel structure constituting the basis of the application.

In carrying out the invention, we provide an all metal band 9 of a width sufficient to extend beyond the sides of the openings 3 and of such length that when engaged snugly about the apertured portion of the magnet frame the ends preferably overlap as shown in Figure 2. Steel of a more or less springy nature is a highly satisfactory material for the purpose especially as it is inexpensive. It is intended that the overlapping ends fall upon one of the lower cross bar portions 5 and to guide the workman in applying the device so that it will be properly located, we provide rivets 10, preferably two in number, secured upon the band and received within openings 11 in the upper portion of the frame 2. The rivets are preferably tapered to facilitate their insertion within the openings and to permit them to draw down properly when the band is contracted by the means to be described.

To hold the band in place against skewing off endwise or displacement longitudinally of the generator, it is preferable to provide an additional rivet 12, one being usually sufficient, received within an opening 13 in one of the lower cross bar portions 5. These rivets are applied to the band in any ordinary or well known manner and though rivets are specified, it should be distinctly understood that any projections of an equivalent nature and capable of performing the same function may be used to equal advantage.

Instead of providing a true cylindrical seat on the generator frame throughout the area to be engaged by the band, we find it perfectly satisfactory to form the frame with a pair of spaced circumferential grooves 14 located beyond the sides of the openings 3, these grooves being for the reception of felt or other similar packing strips or gaskets 15 which may be initially held in place by the simple expedient of shellacking therein as is a very common method in the installation of felt gaskets in machinery of different kinds. It is intended that these packing or gasket strips project somewhat beyond the periphery of the frame so as to be compressingly engaged by the band when the latter is drawn taut, an effectual dust tight and water tight joint being thus obtained.

The means for drawing the band tightly into place is shown as comprising ears 16 and 17 mounted upon the respective end portions of the band, the ear 16 having pivoted thereto at 18, a bolt member 19 carrying a lever nut 20 which abuts against the outer side of the ear 17. It is preferable that the ear 17 be forked to receive the bolt. There is nothing in particular distinctive about this clamping means inasmuch as it is already known in the art.

In order to apply the device, the band, with the clamping means released, is slipped over the end of the generator, or engaged thereabout in any desired manner, and so positioned as to overlie the openings 3. When the rivets 10 are engaged within the openings 11 the ends of the band will be caused to overlie one of the lower cross bar portions 5 and when the rivet 12 is engaged within the opening 13, twisting or other lateral movement of the band itself with respect to the generator will be prevented. The bolt member 19 is then swung through or into the forked ear 17 and the nut 20 tightened to contract the band and compress the gaskets 15. These gaskets are of sufficient thickness, or project to a sufficient extent beyond the surface of the frame that they will fill the slight triangular opening or space at the overlapping ends of the band so that there will be no chance of leakage at this point. If it is necessary for any reason to remove the band, this may be readily accomplished by releasing the clamp, subsequently to which the band may be expanded sufficiently that it may be slipped off from the generator.

From the foregoing description and a study of the drawing it will be apparent that we have thus provided a simply constructed, inexpensive and easily applied band which will be highly satisfactory for the purpose set forth and which has the great advantage of eliminating the employment of the usual lining with the multiplicity of rivets necessary to effect securing thereof in place. The device has proved to be very satisfactory inasmuch as there is provided a positive seal which will exclude dust and dirt as well as water from the interior of the generator. It is believed that the construction, operation and advantages will be readily apparent to one skilled in the art without further explanation.

While we have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, we claim:

1. In a generator having a frame provided with openings opposite the commutator, means for covering said openings comprising a metal band disposable in encircling relation to the frame, means for contracting the band, and packing means carried by the generator frame and engaged by the band, said engagement being limited to restricted circumferential areas adjacent the edges of said band.

2. In a generator having a frame provided with openings opposite the commutator, means for covering said openings comprising a metal band disposable in encircling relation to the frame, means for contracting the band, and packing means carried by the generator frame and engaged by the band, said packing means being in the form of strips extending circumferentially of the frame beyond the edges of said openings.

3. In a generator having a frame provided with openings opposite the commutator, means for covering said openings comprising a metal band disposable in encircling relation to the frame, means for contracting the band, and packing means carried by the generator frame and engaged by the band, said packing means being in the form of strips extending circumferentially of the frame beyond the edges of said openings, the frame having circumferential grooves therein within which said strips are located.

4. In a generator having a frame provided with openings opposite the commutator, means for covering said openings comprising a metal band disposable in encircling relation to the frame, means for contracting the band, and packing means carried by the generator frame and engaged by the band, said packing means being in the form of strips extending circumferentially of the frame beyond the edges of said openings, the frame having circumferential grooves therein, and said strips being secured within said grooves.

5. In a generator having a commutator and including a frame having openings therein separated by bar portions, means for covering the openings comprising a contractile metal band, clamping means carried by the end portions of the band for effecting contraction thereof with the ends in overlapping relation upon one of said bar portions, means comprising recesses formed in certain of said bar portions, and means carried by the band and engaging said recesses for locating said band circumferentially and for preventing lateral displacement thereof.

6. In a generator having a commutator and including a frame having openings therein separated by bar portions, means for covering the openings comprising a contractile metal band, clamping means carried by the end portions of the band for effecting contraction thereof with the ends in overlapping relation upon one of said bar portions, means comprising recesses formed in certain of said bar portions, means carried by the band and engaging said recesses for locating said band circumferentially and for preventing lateral displacement thereof, and packing means mounted on the generator and compressingly engaged by the band adjacent its circumferential edges.

In testimony whereof we affix our signatures.

WILLIAM F. BOUCHÉ.
EMIL H. BLATTNER.